(12) United States Patent
Kim

(10) Patent No.: US 7,121,583 B2
(45) Date of Patent: Oct. 17, 2006

(54) AIRBAG DEVICE

(75) Inventor: Gun Woo Kim, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 213 days.

(21) Appl. No.: 10/650,758

(22) Filed: Aug. 29, 2003

(65) Prior Publication Data

US 2005/0035582 A1    Feb. 17, 2005

(30) Foreign Application Priority Data

Aug. 14, 2003    (KR) ...................... 10-2003-0056458

(51) Int. Cl.
    *B60R 21/231*    (2006.01)
(52) U.S. Cl. ................................. 280/743.2
(58) Field of Classification Search ............. 280/743.2, 280/730.1, 729, 732, 743.1
    See application file for complete search history.

(56) References Cited

U.S. PATENT DOCUMENTS 5,253,892 A * 10/1993 Satoh ...................... 280/743.1
5,997,037 A * 12/1999 Hill et al. ................. 280/743.2
6,032,977 A *  3/2000 Reh et al. .................... 280/729
6,361,072 B1 *  3/2002 Barnes .................... 280/743.2
6,733,037 B1 *  5/2004 Keshavaraj .............. 280/743.2

FOREIGN PATENT DOCUMENTS

JP            11005505 A *  1/1999

\* cited by examiner

*Primary Examiner*—David R. Dunn
(74) *Attorney, Agent, or Firm*—Greenblum & Bernstein, P.L.C.

(57) ABSTRACT

Disclosed herein is an airbag device including a tether attached to an airbag for determining an expansion shape of the airbag. The tether is formed in such a manner that the expansion length of the middle part of an airbag is shorter than the expansion length of both side edges of the airbag when the airbag is expanded, whereby direct contact between the chest or the head of a passenger and the airbag is prevented. Consequently, the passenger is not injured by a punch-out-force created by sudden expansion in the central region of the airbag when the expansion of the airbag is initiated. In addition, the passenger is not subjected to the pressure of the airbag, and the passenger is nestled in the airbag, whereby the passenger is not out of the protection range of the airbag even when a vehicle is rocked from side to side after the airbag has been expanded.

5 Claims, 4 Drawing Sheets

AIRBAG DEVICE

BACKGROUND OF THE INVENTION

1. Field of the Invention

The present invention relates to an airbag device, and more particularly to an airbag device including a tether formed in such a manner that the expansion length of the middle part of an airbag is shorter than the expansion length of both side edges of the airbag when the airbag is expanded.

2. Description of the Related Art

As shown in FIGS. 1 and 2, a conventional airbag device for vehicles generally comprises: an airbag housing 2 mounted to an instrument panel; an airbag 4 accommodated in the front part of the airbag housing 2; an inflator 6 mounted to the rear of the airbag housing 2 for supplying a high-pressure gas to the airbag 4 so that the airbag 4 is expanded toward a passenger 10 when a collision occurs; and an impact sensor (not shown) for sensing a collision of a vehicle.

In the conventional airbag device with the above-stated construction, the high-pressure gas is supplied from the inflator 6 to the airbag 4 when a collision is sensed by means of the impact sensor. As the gas is filled in the airbag 4, the airbag 4 passes through the instrument panel and is expanded toward the passenger 10, as indicated by a dotted line in FIG. 1 and by a solid line in FIG. 2, to absorb kinetic energy from the passenger 10 and thus protect the passenger 10 from injury.

To the inside of the airbag 4 is sewn a tether 8, made of a textile fabric, by which the expansion length of the airbag 4 is determined.

In the conventional airbag device, however, a contact surface 4a of the airbag 4, which makes contact with the passenger 10, is flat. Consequently, the chest (if the passenger 10 is relatively tall) or the head (if the passenger 10 is relatively short) of the passenger 10 rapidly forced forward when the airbag 4 is expanded may be injured by the airbag 4 expanding toward the passenger 10 as shown in FIG. 2. Otherwise, the passenger 10 may be squeezed between the airbag 4 and a seat back 11 so that the passenger 10 may be killed. Furthermore, the passenger 10 may slip laterally from the contact surface 4a of the airbag 4 when a vehicle is rocked from side to side after the airbag has been expanded, whereby the passenger 10 is out of the protection range of the airbag 4.

In addition, the conventional airbag device has another problem in that the gas supplied from the inflator 6 is concentrated to the central region of the airbag 4, as indicated by a dotted line in FIG. 2, when the expansion of the airbag 4 is initiated, and therefore the central region of the airbag 4 is rapidly expanded, which causes a punch-out-force phenomenon hitting the passenger 10.

SUMMARY OF THE INVENTION

Therefore, the present invention has been made in view of the above problems, and it is an object of the present invention to provide an airbag device which is capable of preventing a direct collision between the chest or the head of a passenger and an airbag when the airbag is expanded, thereby improving reliability of the safety of the airbag.

In accordance with the present invention, the above and other objects can be accomplished by the provision of an airbag device including a tether attached to an airbag for determining an expansion shape of the airbag, wherein the tether is formed in such a manner that the expansion length of the middle part of the airbag is shorter than the expansion length of both side edges of the airbag when the airbag is expanded.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
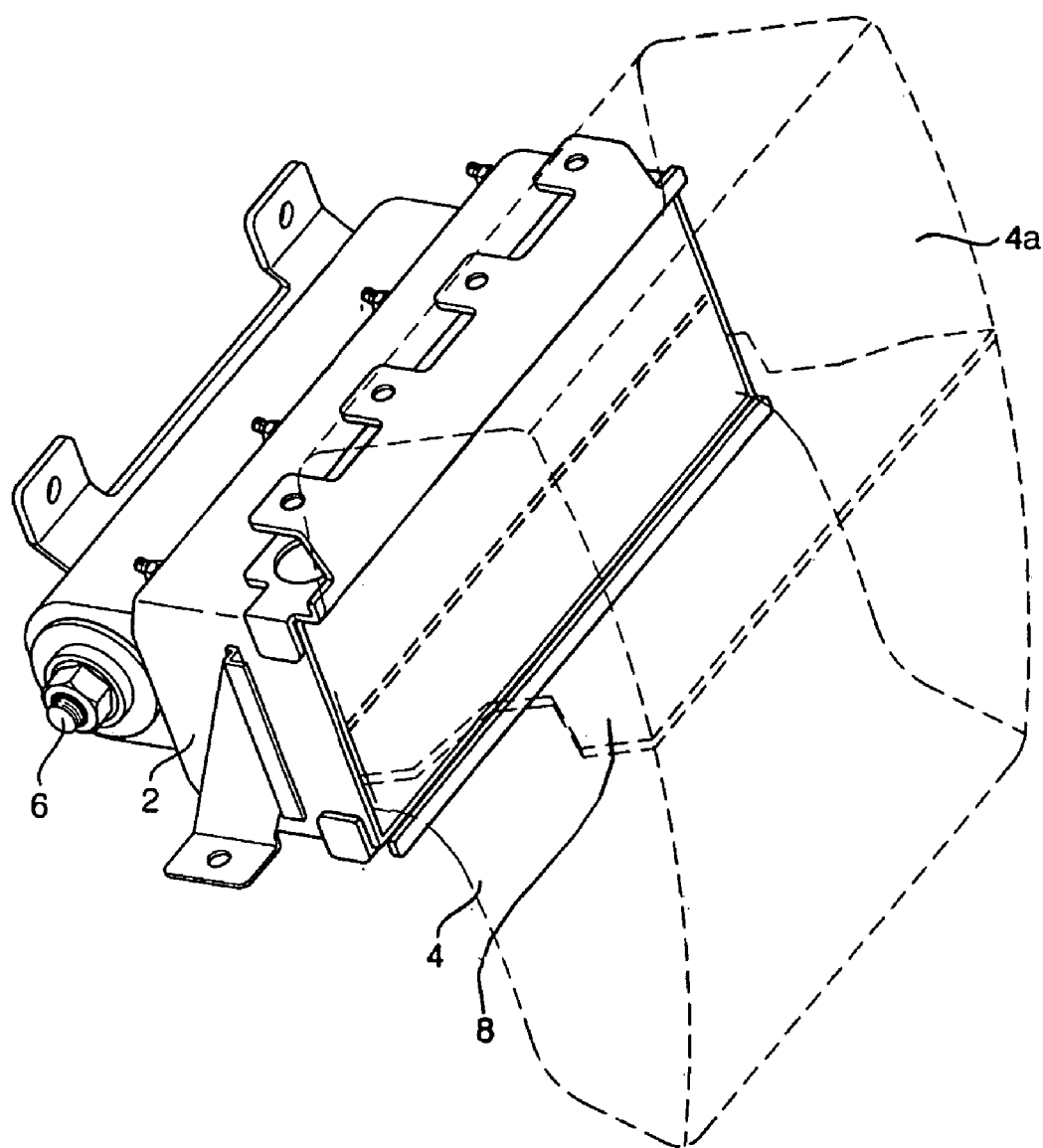
FIG. 1 is a perspective view showing a conventional airbag device.
Figure 2:
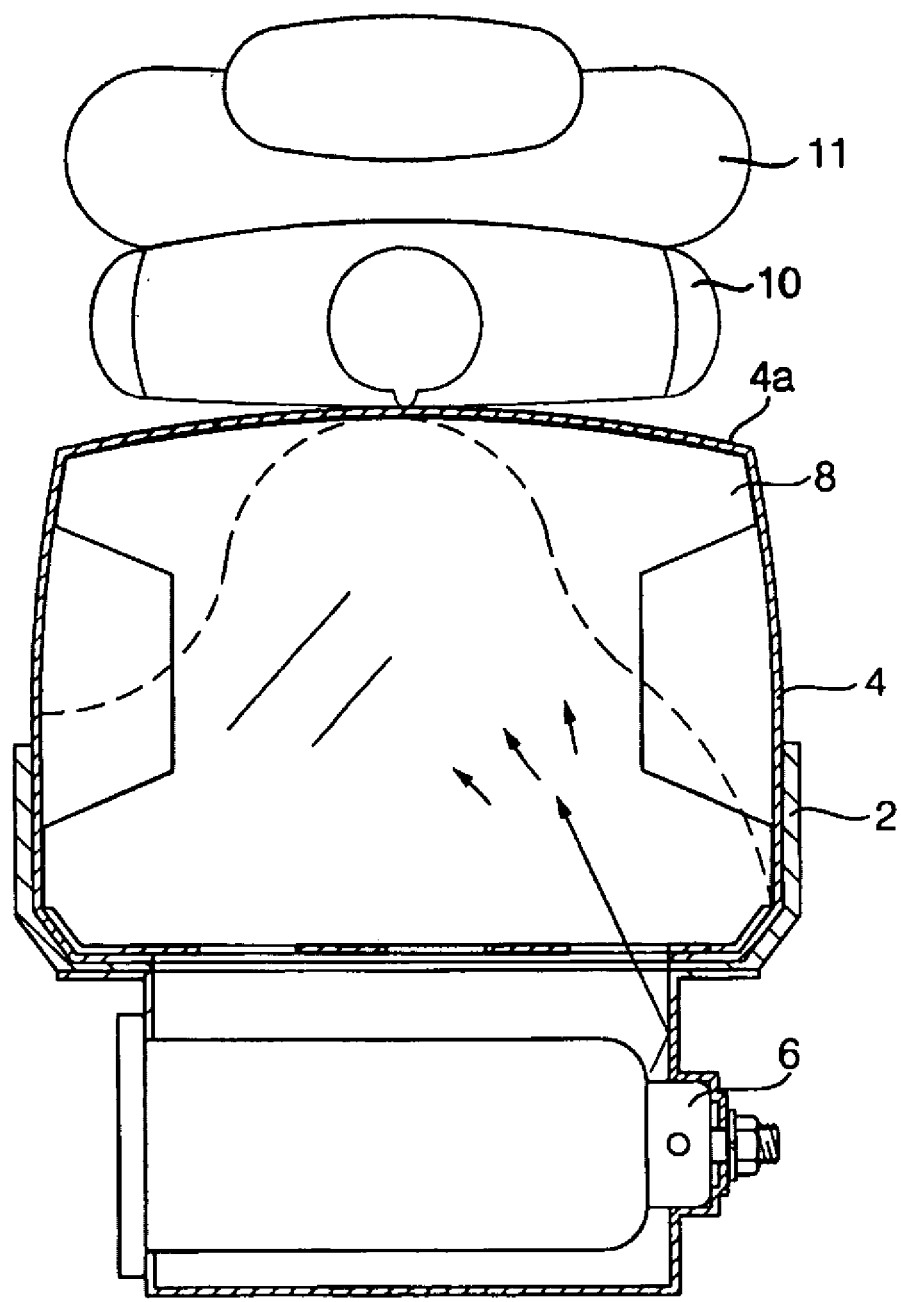
FIG. 2 is a plan view, in section, of the conventional airbag device when an airbag of the airbag device is expanded.
Figure 3:
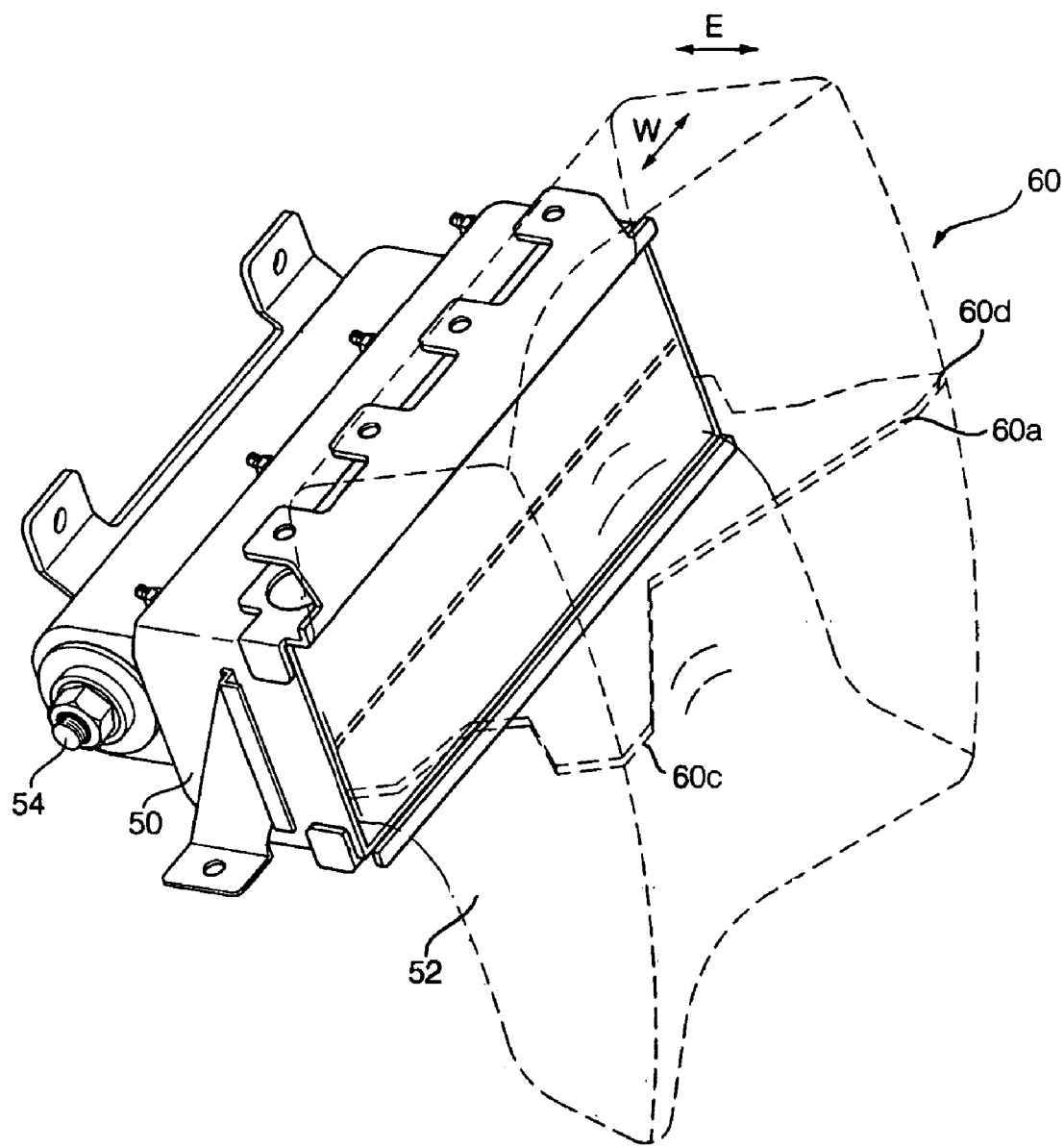
FIG. 3 is a perspective view showing an airbag device according to a preferred embodiment of the present invention.
Figure 4:
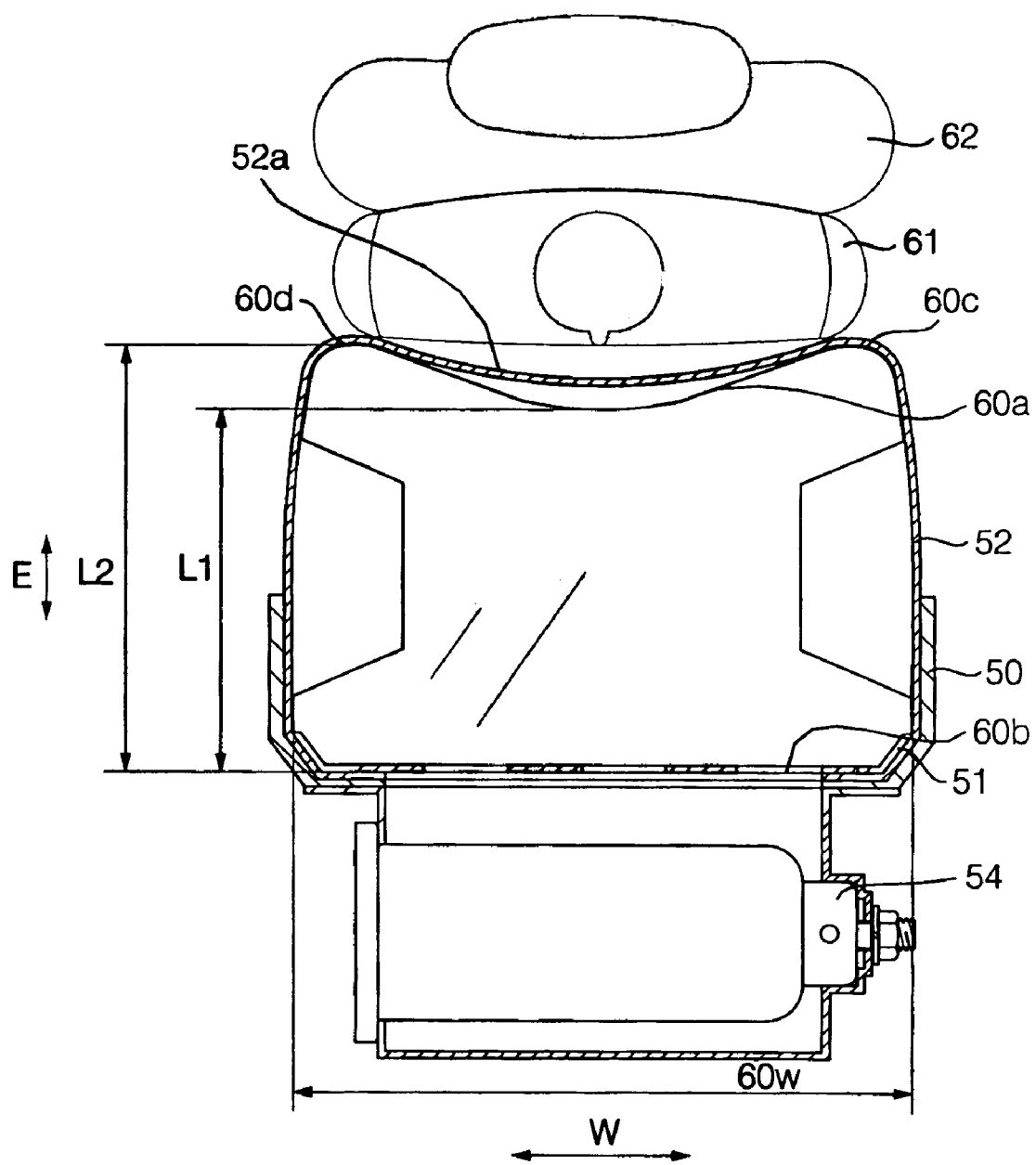
FIG. 4 is a plan view, in section, of the airbag device according to the preferred embodiment of the present invention when an airbag of the airbag device is expanded.

FIG. 3 is a perspective view showing an airbag device according to a preferred embodiment of the present invention, and FIG. 4 is a plan view, in section, of the airbag device according to the preferred embodiment of the present invention when an airbag of the airbag device is expanded.

The airbag device of the present invention comprises: an airbag housing 50; an airbag 52 fixed to the airbag housing 50 by means of a retainer 51 and accommodated in the airbag housing 50 while the airbag 52 is folded in a prescribed shape; an inflator 54 mounted to the airbag housing 50 for supplying a high-pressure gas to the airbag 52 so that the airbag 52 is expanded toward a passenger 61 when a collision occurs; and a tether 60 attached to the inside of the airbag 52 for determining the expansion length of the airbag 52.

The tether 60 is preferably made of the same material as the airbag 52. The tether 60 comprises a front tether part 60a and a rear tether part 60b. The front and rear tether parts 60a and 60b are sewn to the inside of the airbag 52. Consequently, the front and rear tether parts 60a and 60b are spread when the airbag 52 is expanded in such a manner that the front tether part 60a is opposite to the rear tether part 60b in the longitudinal expansion direction of the airbag 52 (in the direction indicated by an arrow E).

Each of the front and rear tether parts 60a and 60b of the tether 60 is formed with a prescribed width of 60 W in the lateral expansion direction of the airbag 52 (in the direction indicated by an arrow W) so that at least right and left edges 60d and 60c of the tether 60 are sewn to the inside of the airbag 52.

When the airbag 52 is excessively expanded toward the passenger 61, the passenger 61 may be squeezed between the airbag 52 and a seat back 62. For this reason, it is preferable that the tether 60 is formed with a prescribed length in the longitudinal expansion direction of the airbag 52 (in the direction indicated by the arrow E).

The tether 60 is formed in such a manner that the expansion length L1 of the middle part of the airbag 52 is shorter than the expansion length L2 of right and left side edges of the airbag 52 in the longitudinal expansion direction of the airbag 52 (in the direction indicated by the arrow E) when the airbag 52 is expanded. In other words, the tether 60 is formed in such a manner that the expansion length of the airbag 52 is gradually decreased from the right and left side edges of the airbag 52 to the middle part of the airbag 52.

Specifically, the tether 60 is formed in such a manner that the front tether part 60a of the tether 60, which is close to the passenger 61 when the airbag 52 is expanded, is inclined in the shape of straight lines with prescribed inclinations from the right and left side edges of the airbag 52 to the middle part of the airbag 52, respectively, when the airbag 52 is expanded. Also, the tether 60 is formed in a bilaterally symmetrical fashion about the middle part of the airbag 52 in the lateral expansion direction of the airbag 52 (in the direction indicated by the arrow W). Consequently, the contact surface 52a of the airbag 52, which makes contact with the passenger 61 when the airbag 52 is expanded, is concave in such a manner that the contact surface 52a of the airbag 52 is spaced apart from the passenger 61.

The tether 60 may be formed in such a manner that the front tether part 60a of the tether 60 is curved when the airbag 52 is expanded.

Therefore, the shoulders of the passenger 61 make contact with the right and left side edges of the airbag 52 because of the shape of the airbag 52, which was described in detail above, when the airbag 52 is expanded, whereby the passenger 61 is prevented from being rapidly forced forward. At this time, the head or the chest of the passenger 61 does not make contact with the airbag 52, whereby the passenger 61 is not hit by the expansion pressure of the airbag 52.

Also, the passenger 61 is securely supported by the right and left side edges of the airbag 52 so that he/she is nestled in the airbag 52, and thus the passenger 61 is not out of the protection range of the airbag 52 even when the vehicle is rocked from side to side after the airbag 52 has been expanded.

If the passenger 61 is a small-sized person, for example, a child, the shoulders of the passenger 61 do not make contact with the right and left side edges of the airbag 52. In other words, the shoulders of the passenger 61 are put between the right and left side edges of the airbag 52. However, there is created sufficient space between the airbag 52 and the passenger 61, and thus the passenger 61 does not make contact with the middle part of the airbag 52, or the passenger 61 is not subjected to the pressure of the airbag 52 even when he/she makes contact with the middle part of the airbag 52, whereby the performance of the airbag 52 is improved.

The operation of the airbag device with the above-stated construction according to the present invention will now be described.

When a collision occurs, a high-pressure gas is supplied from the inflator 54 to the airbag 52. As the high-pressure gas is filled in the airbag 52, the airbag 52 is expanded toward the passenger 61 to protect him/her from an impact.

At this time, the head or the chest of the passenger 61 does not make contact with the airbag 52, or it is not subjected to the pressure of the airbag 52 even if it makes contact with the airbag 52, whereby the passenger 61 is not injured by the airbag 52.

As apparent from the above description, the present invention provides an airbag device including a tether formed in such a manner that the expansion length of the middle part of an airbag is shorter than the expansion length of both side edges of the airbag when the airbag is expanded, whereby direct contact between the chest or the head of a passenger and the airbag is prevented, and thus the passenger is not injured by a punch-out-force created by sudden expansion in the central region of the airbag when the expansion of the airbag is initiated. In addition, the passenger is not subjected to the pressure of the airbag, and the passenger is nestled in the airbag, whereby the passenger is not out of the protection range of the airbag even when a vehicle is rocked from side to side after the airbag has been expanded, and thus reliability of the safety of the airbag is improved.

Furthermore, the present invention has another effect in that a small-sized passenger, for example, a child does not make contact with the middle part of the airbag, or the passenger is not subjected to the pressure of the airbag even when he/she makes contact with the middle part of the airbag although he/she is nestled in the airbag, whereby the performance of the airbag is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag device including a tether attached to an airbag for determining an expansion shape of the airbag, the tether comprising:
    a laterally extending rear part attached to a rear wall of the airbag along a substantially flat portion of the rear wall; and
    a laterally extending front part attached to a front wall of the airbag and extending generally transverse to a vertical cross-section of the airbag along a middle portion of the front wall such that the tether extends across a width of the airbag that includes side edges of the airbag, the laterally extending front part including lateral edge portions,
    wherein the tether is formed in such a manner that an expansion length of a middle part of the airbag is shorter than an expansion length of the side edges of the airbag when the airbag is expanded.

2. The device as set forth in claim 1, wherein the tether is provided in such a manner that an expansion length of the airbag is gradually decreased from the side edges of the airbag to the middle part of the airbag when the airbag is expanded.

3. The device as set forth in claim 2, wherein the tether is provided in such a manner that the front part of the tether is linearly inclined away from the front wall of the airbag at the middle portion when the airbag is expanded.

4. The device as set forth in claim 2, wherein the tether is provided in such a manner that the front part of the tether is curved away from the front wall of the airbag at the middle portion when the airbag is expanded.

5. The device as set forth in claim 2, wherein the tether is formed in a bilaterally symmetrical fashion about the middle part of the airbag.

* * * * *